United States Patent [19]
Kakimoto et al.

[11] Patent Number: 5,305,151
[45] Date of Patent: Apr. 19, 1994

[54] OBJECTIVE LENS DRIVER

[75] Inventors: Hiroaki Kakimoto; Masahiko Chaya, both of Yokohama, Japan

[73] Assignee: Canon Kabushiki Kaisha, Tokyo, Japan

[21] Appl. No.: 8,843

[22] Filed: Jan. 25, 1993

Related U.S. Application Data

[63] Continuation of Ser. No. 790,513, Nov. 12, 1991, abandoned.

[30] Foreign Application Priority Data

| | | |
|---|---|---|
| Nov. 14, 1990 [JP] | Japan | 02-309759 |
| Mar. 29, 1991 [JP] | Japan | 03-066235 |
| Jun. 28, 1991 [JP] | Japan | 03-158479 |

[51] Int. Cl.⁵ .................................. G02B 7/02
[52] U.S. Cl. ...................... 359/814; 359/824; 369/44.16; 369/44.22
[58] Field of Search ............ 359/813, 814, 823, 824, 359/825; 369/44.15, 44.16, 44.22

[56] References Cited
U.S. PATENT DOCUMENTS

| | | | |
|---|---|---|---|
| 4,554,653 | 11/1985 | Malissin et al. | 359/814 |
| 4,613,962 | 9/1986 | Inoue et al. | 369/44.22 |
| 4,798,447 | 1/1989 | Jansen et al. | 359/824 |
| 5,124,965 | 6/1992 | Mizuno et al. | 369/44.15 |
| 5,150,343 | 9/1992 | Goto et al. | 369/44.22 |

FOREIGN PATENT DOCUMENTS 0350225  1/1990  European Pat. Off.

OTHER PUBLICATIONS

Patent Abstracts of Japan, Kokai No. 57-110069, vol. 6, No. 200, Oct. 1982.

*Primary Examiner*—Loha Ben
*Attorney, Agent, or Firm*—Fitzpatrick, Cella, Harper & Scinto

[57] ABSTRACT

An objective lens driver includes first and second permanent magnets disposed in opposed relationship with each other, first and second yokes for supporting the first and second permanent magnets, respectively, a movable member disposed in a first magnetic gap formed by the first and second permanent magnets, a coil for driving in the tracking direction provided on the movable member and wound on the first and second permanent magnets and the first and second yokes, an objective lens supporting member movably provided on the movable member, and a focusing coil provided on the supporting member and disposed in the first magnetic gap for moving the objective lens supporting member in the focusing direction.

14 Claims, 9 Drawing Sheets

TRACKING DIRECTION

OBJECTIVE LENS DRIVER

This application is a continuation of prior application, Ser. No. 07/790,513 filed Nov. 12, 1991, now abandoned.

BACKGROUND OF THE INVENTION

1. Field of the Invention

This invention relates to an objective lens driver in an optical disk apparatus for driving an objective lens for an optical disk in a focusing direction and a tracking direction.

2. Related Background Art

Generally, an objective lens driver in an optical disk apparatus has two kinds of coils and a magnetic circuit for moving an objective lens in a focusing direction and a tracking direction, and one more kind of coil and a magnetic circuit, i.e, a linear motor, for causing the objective lens to seek any position in the radial direction of an optical disk, in order to effect the recording, reproduction and erasing of information on the optical disk. In recent years, there has been proposed an objective lens driver in which, for the purpose of shortening access time, an actuator for driving in the tracking direction and a linear motor are made common and further, a magnetic circuit for driving in the tracking direction is made common to that of the linear motor to thereby reduce the gross weight and simplify the driving portion.

Figure 1:
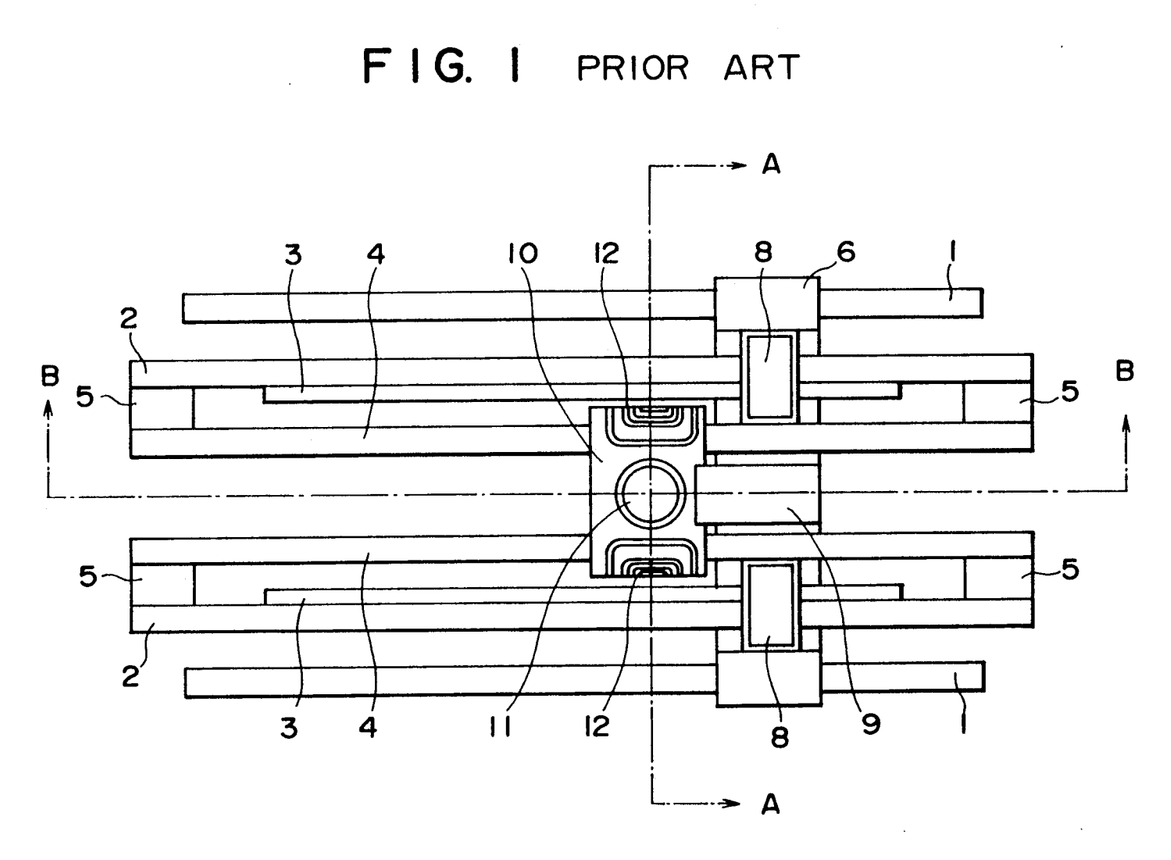
FIG. 1 is a plan view showing an objective lens driver according to the prior art.
Figure 2:
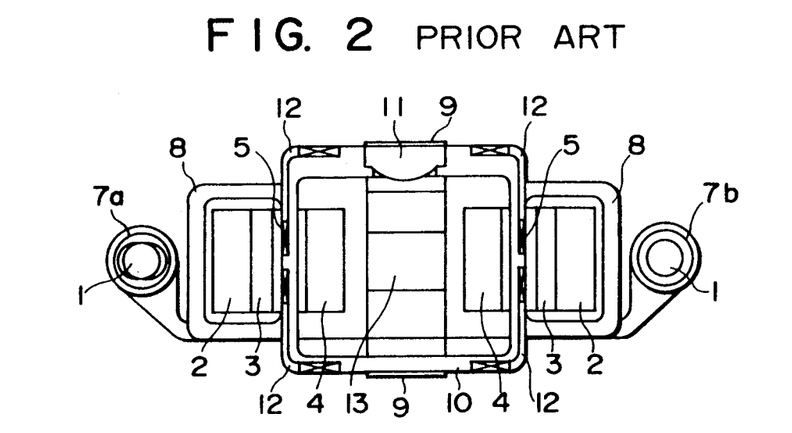
FIG. 2 is a cross-sectional view of the FIG. 1 driver taken along line A—A in FIG. 1.
Figure 3:
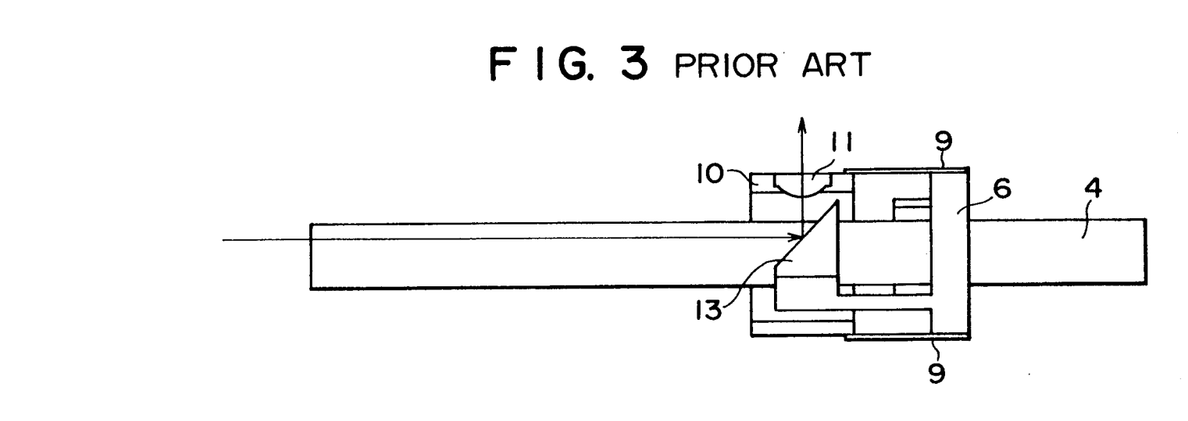
FIG. 3 is a cross-sectional view of the FIG. 1 driver taken along line B—B of FIG. 1.

FIGS. 1 to 3 of the accompanying drawings show an example of an objective lens driver according to the prior art in which a magnetic circuit is common to a driving portion in the focusing direction and a linear motor, FIG. 1 being a plan view, FIG. 2 being a cross-sectional view taken along line A—A of FIG. 1, and FIG. 3 being a cross-sectional view taken along line B—B of FIG. 1. Two parallel rails 1 and 1 are horizontally disposed on a base, not shown, and outer yokes 2 and 2, having a permanent magnets 3 and 3 attached to the inner sides thereof, and inner yokes 4 and 4 spaced slightly apart from the permanent magnets are fixed parallel and symmetrically in succession from the outer side between the two rails 1 and 1. The outer yokes 2 and the inner yokes 4 are equal in length to each other, and are connected together at their opposite ends by relay yokes 5. The permanent magnets 3 are shorter in length than the spacing between the relay yokes 5 and 5 at the two ends of an outer yoke 2, and are spaced apart from both of the relay yokes 5 and 5 at the two ends of an outer yoke 2. A carriage 6 is positioned between the rails 1 and 1 and is supported on the rails 1 and 1 through bearings 7a and 7b, and are movable in a direction parallel to the rails 1 and 1, i.e., the tracking direction. Coils 8 and 8 are fixed to the carriage 6, and the yokes 2 and the permanent magnets 3 pass through these coils. Vertically parallel leaf springs 9 and 9 are forwardly mounted on the central portion of the carriage 6 and vertically movably support a lens holding member 10 forward of the carriage 6. The lens holding member 10 is annular and the inner yokes 4 and 4 pass therethrough, and the lens holding member 10 holds an objective lens 11 on the center of the upper surface thereof with the optical axis of the objective lens kept vertical, and coils 12 and 12 are provided from the upper portions of the sides thereof to the end of the upper surface thereof and from the lower portions of the sides thereof to the end of the lower surface thereof. A portion of the carriage 6 is extended to the center of the lens holding member 10 and holds a 45° upwardly facing mirror 13 just beneath the objective lens 11.

With such a construction, when an electric current is supplied to the coils 8, an electromagnetic force acts between the magnetic field between the permanent magnet 3 and the inner yoke 4 and the coil 8 and therefore, the carriage 6 is driven in the tracking direction by the electric current flowing to the coils 8 and 8. Also, the coils 12 and 12 are subjected to a vertical force by the same magnetic field by the electric current being supplied thereto and therefore can drive the objective lens 11 in the focusing direction.

In the above-described example of the prior art, however, the inner yokes 4 and 4 are passed through the lens holding member 10 and therefore, the rigidity of the lens holding member 10 becomes low, and this results in a reduction in the dynamic characteristic of focus control, which in turn is liable to cause sub-resonance. (FIG. 4 of the accompanying drawings shows the dynamic characteristic of focus control. Since the structural resonance of the lens holding member is as low as ten and several kHz, the focus controllable zone is narrow.) Also, the lens holding member 10 becomes bulky, and this leads to the disadvantage that the carriage 6 becomes bulky.

SUMMARY OF THE INVENTION

The present invention has been made in view of the above-noted problems and an object thereof is to provide a compact objective lens driver which is excellent in controllability.

The above object is achieved by an objective lens driver having first and second permanent magnets disposed in opposed relationship with each other, first and second yokes for supporting the first and second permanent magnets, respectively, a movable member disposed in a first magnetic gap formed by the first and second permanent magnets, a seeking coil provided on the movable member and wound on the first and second permanent magnets and said first and second yokes, an objective lens supporting member movably provided on the movable member, and a focusing coil provided on the supporting member and disposed in the first magnetic gap for moving the objective lens supporting member in the focusing direction.

Also, the above object is achieved by an objective lens driver having first and second permanent magnets disposed in opposed relationship with each other, first and second yokes for supporting the first and second permanent magnets, respectively, a movable member disposed in a first magnetic gap formed by the first and second permanent magnets, a seeking coil provided on the movable member and wound on the first and second permanent magnets and the first and second yokes, an objective lens supporting member movably provided on the movable member, a focusing coil provided on the supporting member and disposed in the first magnetic gap for moving the objective lens supporting member in the focusing direction, and a third permanent magnet disposed in opposed relationship with the first and second yokes and forming a second magnetic gap in which one side of the seeking coil is positioned.

DETAILED DESCRIPTION OF THE PREFERRED EMBODIMENTS

The objective lens driver of the present invention will hereinafter be described in detail with respect to the embodiments thereof shown in FIGS. 5 to 15.

Figure 5:
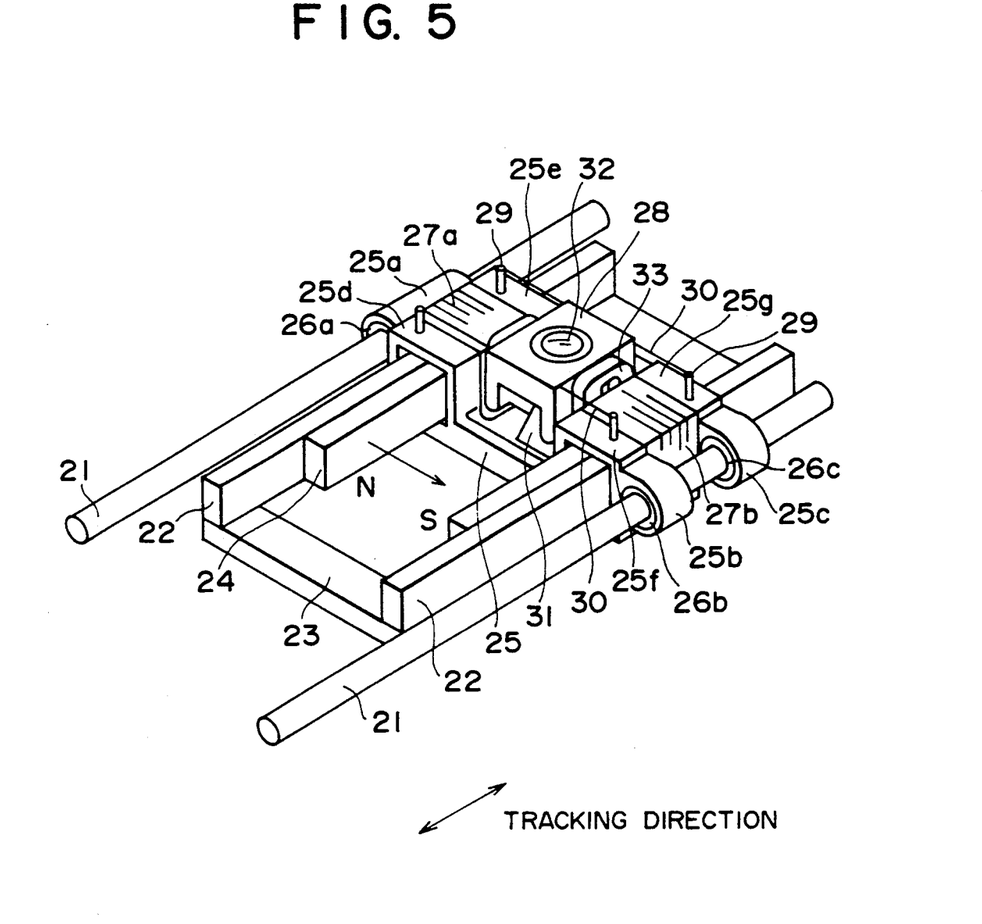
FIG. 5 is a perspective view showing a first embodiment of the objective lens driver of the present invention.
Figure 6:
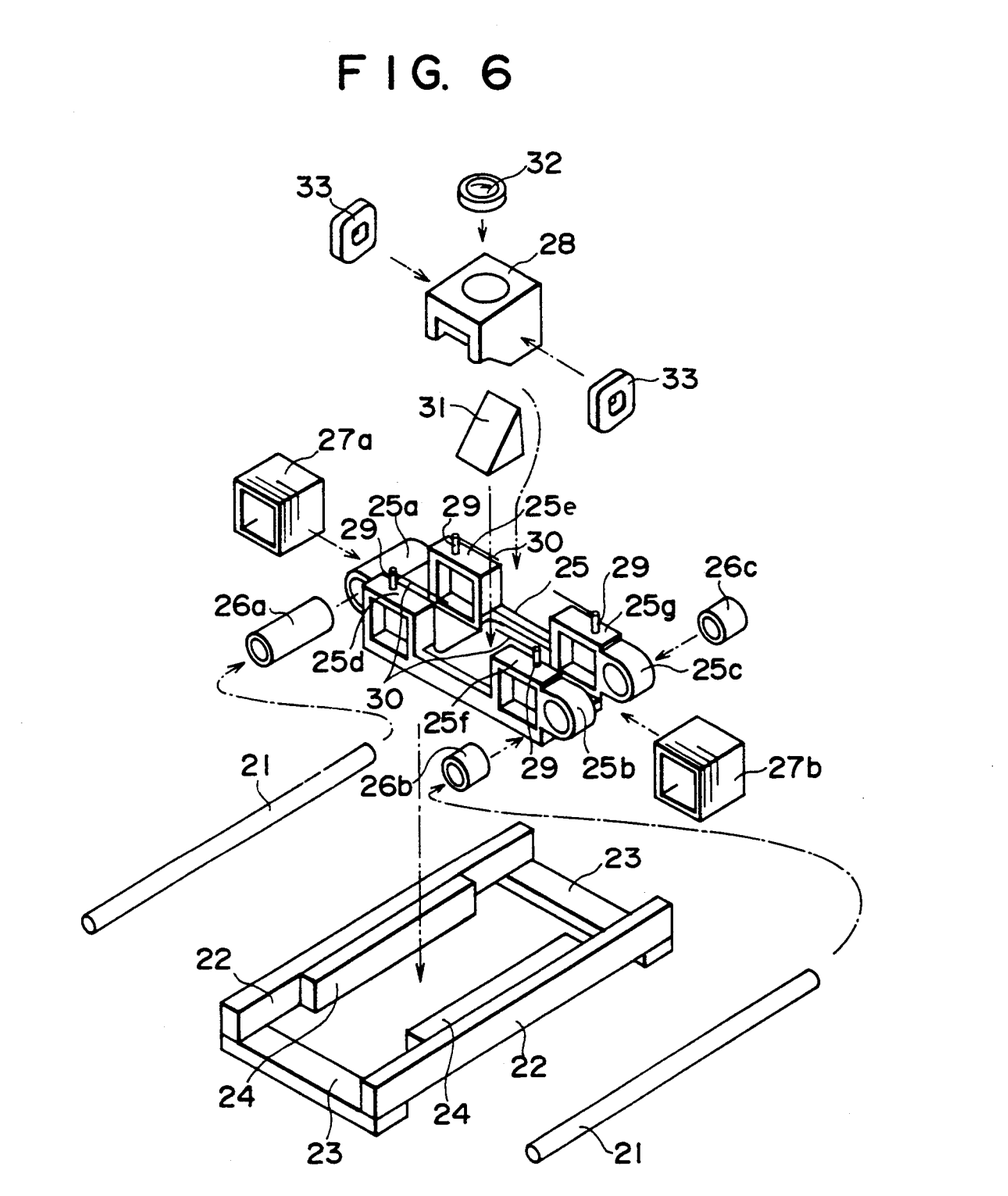
FIG. 6 is an exploded perspective view of the driver shown in FIG. 5.

FIGS. 5 and 6 show a perspective view and an exploded perspective view, respectively, of a first embodiment. Two rails 21 and 21 parallel to the tracking direction are fixed to a base plate, not shown, on a horizontal plane, and parallel yokes 22 and 22 are fixed between the rails 21 and 21. The yokes 22 and 22 are coupled together by relay yokes 23 and 23 attached to the front and rear ends of the lower surfaces of the yokes 22 and 22, and plate-like permanent magnets 24 and 24 are mounted on the opposed surfaces of the yokes 22 and 22 with their different magnetic poles facing each other. The rails 21, 21, the yokes 22, 22, the relay yokes 23, 23 and the permanent magnets 24, 24 are bisymmetrical except for the direction of magnetic poles. A carriage 25 is positioned between the rails 21 and 21, and an annular bearing member 26a is fitted to the left bearing portion 25a thereof and the rail 21 passes therethrough, and bearing members 26b and 26c are fitted to the two bearing portions 25b and 25c of the carriage 25 which occupy the fore and rear portions of the right side of the carriage 25, and the right rail 21 passes through these bearing members, and the carriage 25 is supported for movement in the tracking direction by the rails 21 and 21. Annular arms 25d and 25e are provided inwardly of the bearing portion 25a, and arms 25f and 25g are provided inwardly of the bearing portions 25b and 25c. An annular coil 27a is interposed between the arms 25d and 25e, an annular coil 27b is interposed between the arms 25f and 25g, and the yokes 22 and the permanent magnets 24 pass through all of the arms 25d, 25e, 25f, 25g and the coils 27a, 27b. A hollow, substantially rectangular parallel piped lens holding member 28 is positioned on the center of the carriage 25, and is supported by a wire 30 comprising a resilient member extended between projections 29 provided on the upper portions of the arms 25d-25g. A mirror 31 is forwardly, obliquely and upwardly fixed to the interior of the lens holding member 28, and an objective lens 32 is fixed above the mirror 31, and rectangular coils 33 and 33 are adhesively secured to the right and left outer sides of the lens holding member which face the permanent magnets 24 and 24. The rectangular coils 33 and 33 are adhesively secured so that of the two sides thereof parallel to the tracking direction, the upper side may be off a magnetic field formed by the permanent magnets 24 and 24.

A light beam which has entered from ahead of the mirror 31 in parallel to the tracking direction is reflected upwardly by the mirror 31, and is focused on an optical disk, not shown, through the objective lens 32. The lens holding member 28 lies in the magnetic field between the magnetic poles of the permanent magnets 24 and 24, and when an electric current is supplied to the coils 33 and 33, an electromagnetic force works, whereby the lens holding member is moved to a position in which it is balanced with the tension of the wire 30 and therefore, the objective lens 32 can be driven in the focusing direction by the electric current supplied to the coils 33 and 33. Also, the same magnetic flux crosses the coils 27a and 27b and therefore, by an electric current being supplied to the coils 27a and 27b, the carriage 25 is driven in the tracking direction and the objective lens 32 is driven in the tracking direction.

By such a construction, the coils 33 and 33 are positioned between the coils 27a and 27b and thus, the same magnetic flux passes through the four coils 27a, 27b, 33 and 33, and this leads to the advantage that the length of the permanent magnets 24 and 24 can be shortened relative to the movable range of the carriage 25 and the yokes 22 and 22 can also be shortened.

Figure 7:
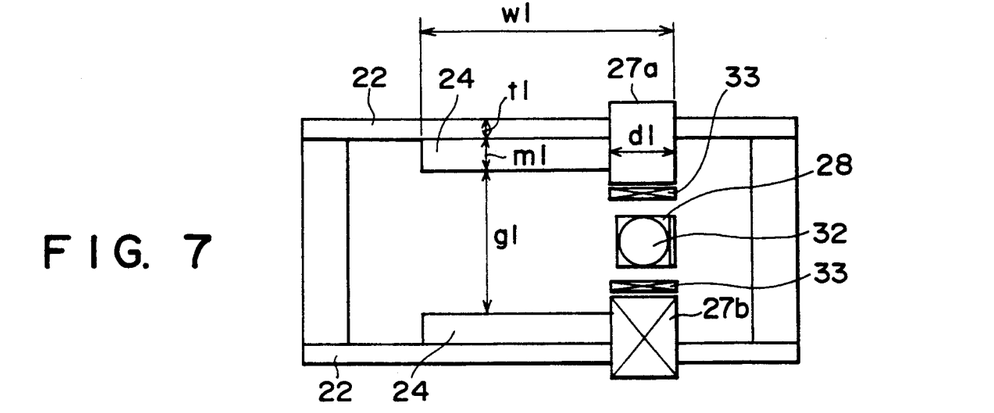
FIG. 7 is a plan view showing the arrangement of the magnetic circuit, the lens holding member and the coils of the driver shown in FIG. 5.
Figure 8:
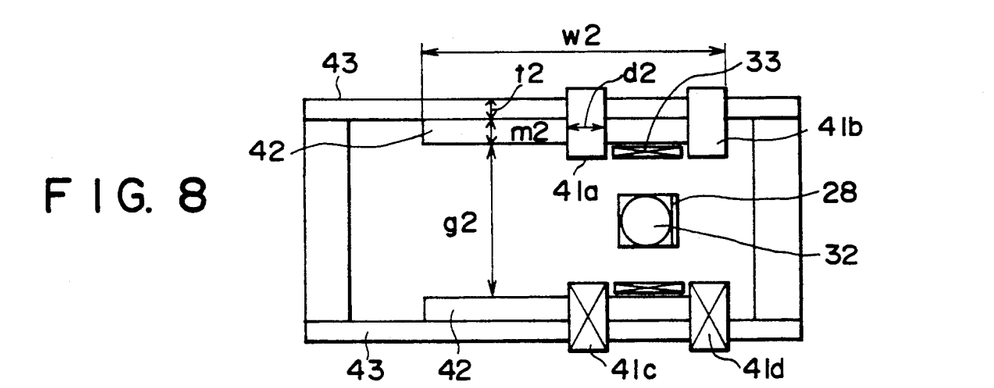
FIGS. 8 and 9 are plan views showing the arrangements of magnetic circuits, lens holding members and coils in second and third embodiments, respectively, of the present embodiment.

FIG. 7 shows the dimensions of each portion of a first embodiment, and FIG. 8 shows an example of the dimensions of a second embodiment. In the first embodiment, the right and left coils 27a and 27b of width d1 are divided into front and rear portions to provide four coils 41a, 41b, 41c and 41d of width d2=d1/2, and the coils 33 are disposed between the front and rear coils 41a and 41b and between the front and rear coils 41c and 41d.

In such a construction, the magnetic gap g2 becomes smaller by an amount corresponding to the sum of the thicknesses of the coils 27a and 27b plus the clearance between the coil 27a and the coil 33 and the clearance between the coil 27b and the coil 33. That is, the spacing between the permanent magnets 24 and 24 which was g1 narrows to g2. Thereby, the permeance coefficient of the permanent magnets 24 becomes higher and therefore, assuming that the required magnetic flux densities are equal, there are provided permanent magnets 42 of thickness m2 thinner than the permanent magnets 24 of thickness m1, and the thickness of the yokes 22 which was t1 becomes slightly greater and there are provided yokes 43 of thickness t2. Also, the length w2 of the permanent magnets 42, as compared with the length w1 of the permanent magnets 24, becomes greater by an amount corresponding to d2×2 plus the clearance between the coil 41 and the coil 33. In this manner, the use of thinner permanent magnets 42 becomes possible.

Figure 9:
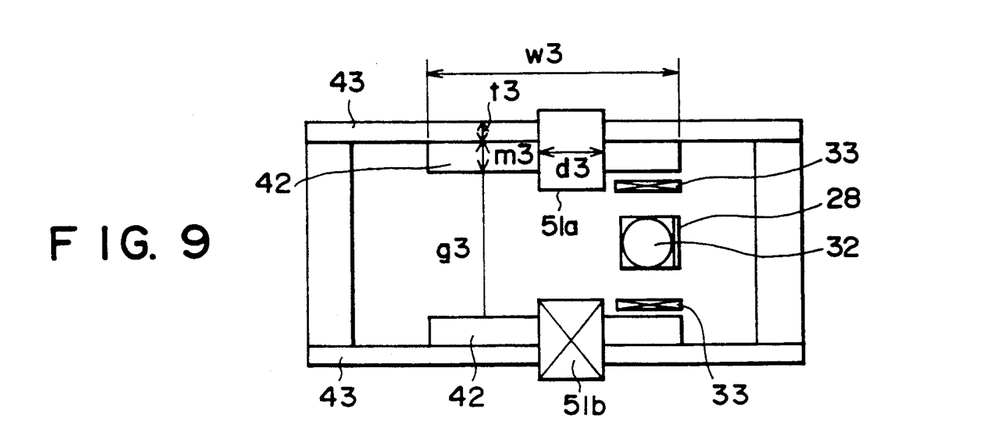

A third embodiment is one in which as shown in FIG. 9, the coils 27a and 27b in the first embodiment are not divided, but are arranged in the tracking direction as coils 51a and 51b and the width d3 of the coils 51a and 51b is equal to the width d1 of the coils 27a and 27b in the first embodiment and the length w3 and thickness m3 of the permanent magnets 42 and the thickness t3 of the yokes 43 are equal to w2, m2 and t2, respectively, in the second embodiment. In this construction, in addition to the advantage of the second embodiment the width d3 of the coils 51a and 51b are twice as great as the width d2 of the coil 41 and therefore, rigidity is high and the frequency characteristic of the driving in the tracking direction is improved.

Figure 10:
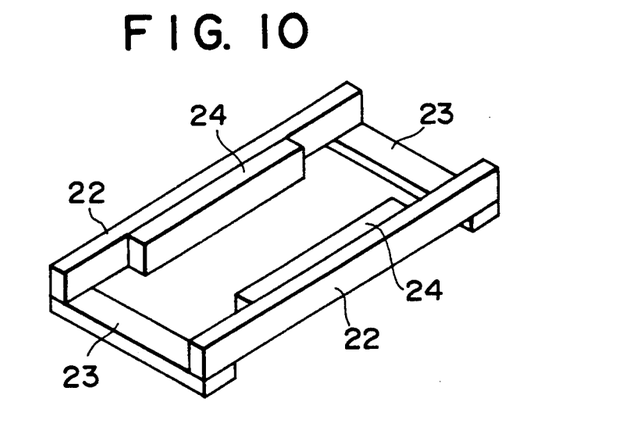
FIG. 10 is a perspective view of the magnetic circuit of the driver shown in FIG. 5.
Figure 11:
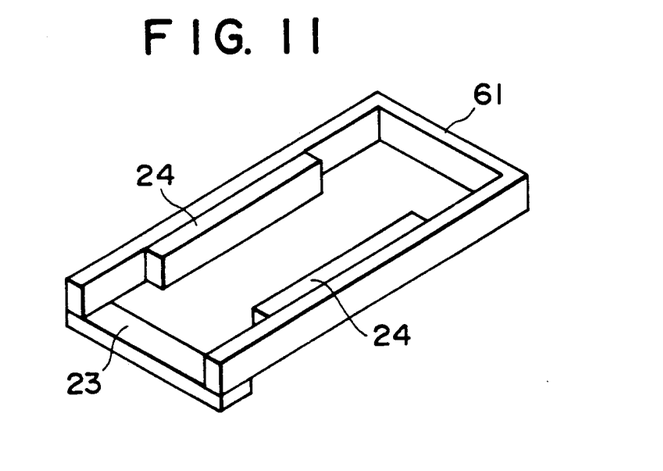
FIGS. 11 and 12 are perspective views of magnetic circuits in fourth and fifth embodiments, respectively, of the present invention.

FIG. 10 shows a perspective view of a magnetic circuit in the first embodiment, and FIG. 11 shows a magnetic circuit in a fourth embodiment. In the fourth embodiment, the rear relay yoke 23 mounted on the lower surfaces of the end portions of the yokes 22 and 22 in the first embodiment is replaced by an integral "U"-shaped yoke 61, and a relay yoke 23 is mounted on the fore end of the lower surface of the open portion of the yoke 61 so that a light beam incident on the mirror 31 on the carriage 25 from ahead may not be intercepted by the relay yoke 23. In this fourth embodiment, the longitudinal symmetry of the magnetic circuit is lost, but the number of parts is reduced.

Figure 12:
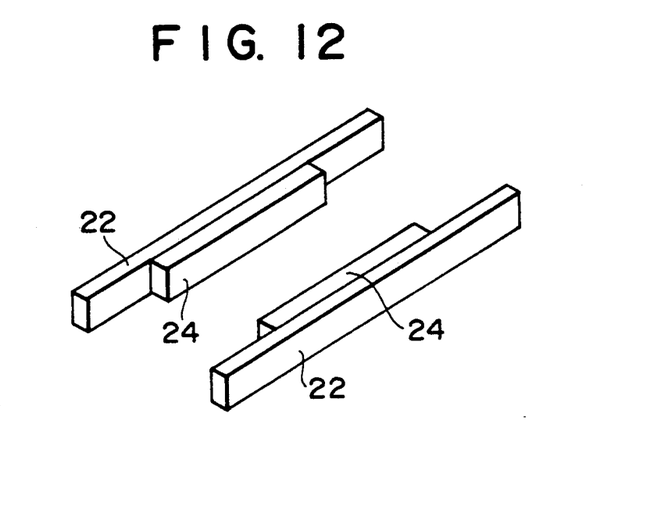

FIG. 12 shows a fifth embodiment in which the relay yokes 23 and 23 in the first embodiment are eliminated. In such a construction, it is not possible for the magnetic field near the end portions, of the permanent magnets 24 and 24 to pass through the relay yokes 23 and cause a short-circuit.

In each of the above-described embodiments, the inner yokes 4 and 4 in the prior art are eliminated and the lens holding member 28 is disposed between the permanent magnets 24 and 24, whereby the throughholes heretofore formed in the lens holding member 10 to pass the inner yokes 4 and 4 therethrough are eliminated. That is, the rigidity of the lens holding member 10 is enhanced.

A sixth embodiment of the present invention will now be described.

Figure 13A:
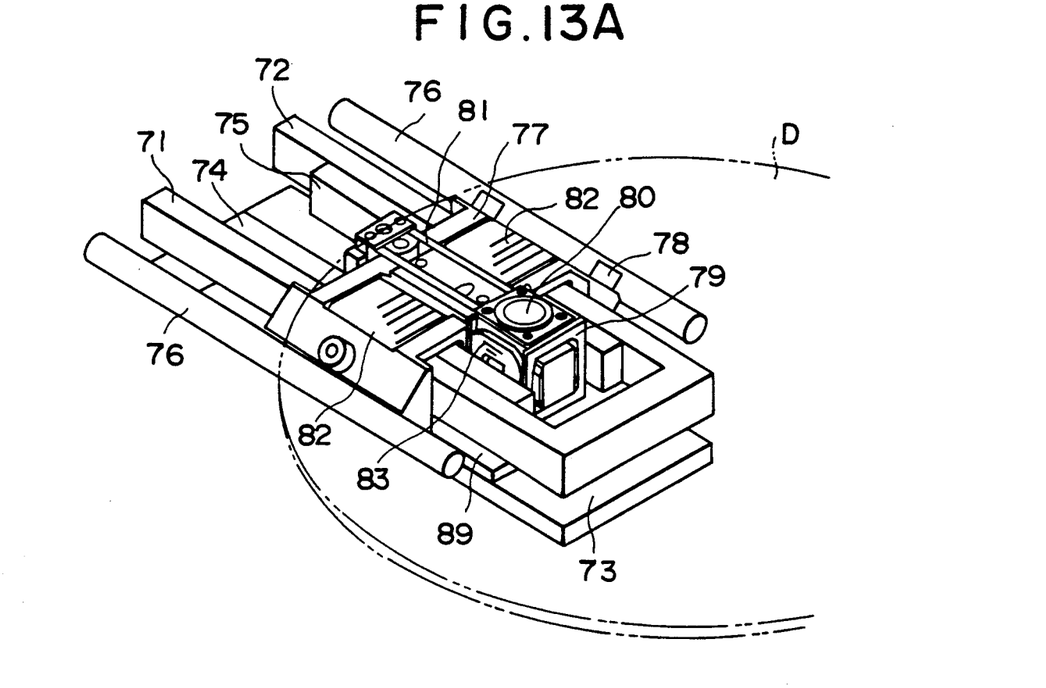
FIG. 13A is a perspective view showing a sixth embodiment of the objective lens driver of the present invention.
Figure 13B:
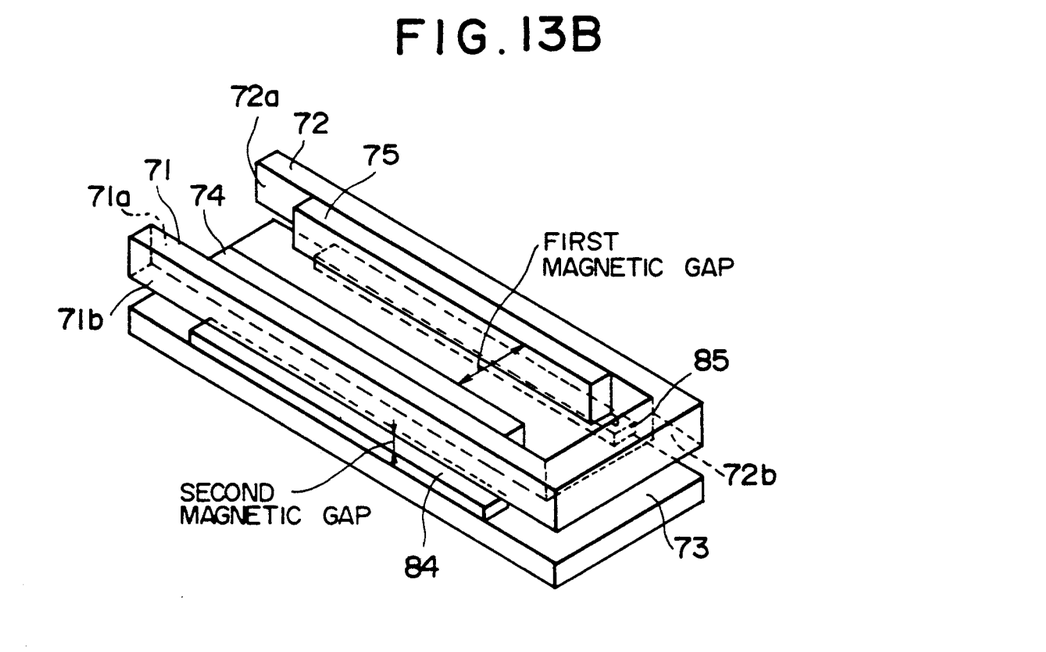
FIG. 13B is a perspective view showing a magnetic circuit in the driver shown in FIG. 13A.

FIG. 13A shows a perspective view of the sixth embodiment, and FIG. 13B shows a cross-sectional view of a magnetic circuit in the sixth embodiment.

In FIG. 13A, the reference numeral 80 designates an objective lens mounted on a lens holder 79. A focusing coil 83 for driving the lens holder 79 in a direction parallel to the optical axis of the objective lens to thereby effect the focusing operation is mounted on a side of the lens holder 79, and one side of the rectangular coil is disposed in a first magnetic gap shown in FIG. 13B and the coil operates. The first magnetic gap is formed by permanent magnets 74 and 75 disposed in opposed relationship with each other. The permanent magnets 74 and 75 are supported by the sides 71a and 72a, respectively, of back yokes 71 and 72.

Further, the objective lens 80 and the focusing coil 83 are supported by a movable member 77 with the aid of a leaf spring 81 through the lens holder 79. The movable member 77 is also disposed in the first magnetic gap. The leaf spring 81 is comprised of a parallel leaf spring deformable in a direction parallel to the optical axis of the objective lens 80. Each of square annular coils 82 (coils for driving in the tracking direction) mounted on the movable member 77 is wound so as to surround an outer yoke and the permanent magnet in such a manner that each one side of the square thereof passes through the first magnetic gap formed by the permanent magnets 74 and 75 and a second magnetic gap formed by permanent magnets 84 and 85 disposed in opposed relationship with the lower surfaces 71b and 72b, respectively, of the back yoke 71 supporting the permanent magnet 74 and the back yoke 72 supporting the permanent magnet 75 and having the direction of magnetic field differing from the direction of the magnetic field of the first magnetic gap. The movable member 77 is supported by a guide rail 76 through a ball bearing 78 and is movable in the radial direction of a disk. Reference numeral 73 denotes a back yoke, which supports permanent magnets 84 and 85.

Figure 14A:
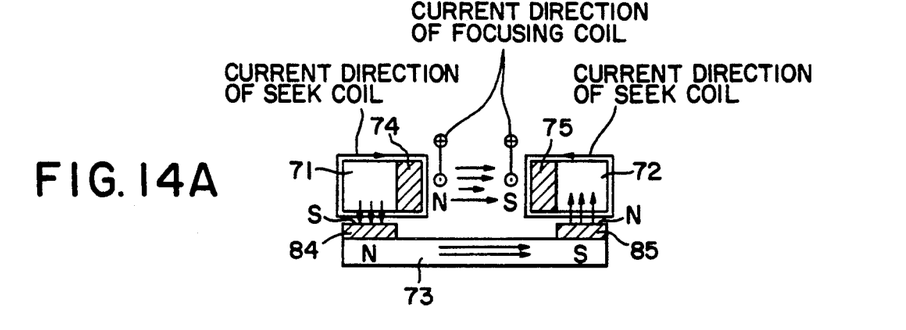
FIG. 14A is a cross-sectional view of the magnetic circuit of the driver shown in FIGS. 13A and 13B.

Also, where the arrangement of the polarities of the permanent magnets as shown in FIG. 14A is adopted in the above-described construction, the magnetization vector between the back yokes 71 and 72 becomes horizontal with respect to a plane orthogonal to the optical axis of the objective lens, and the magnetic path resistance of the magnetic circuit applying a magnetic field to the coils 82 is smallest and the magnetic flux density of each gap becomes greatest and further, the leakage flux is minimized, and this is particularly effective for an apparatus of the magneto-optical recording type which utilizes thermo-magnetic recording.

As described above, in the objective lens driver according to the sixth embodiment, a magnetic gap in which one side of each of the wound coils 82 is positioned is formed at two locations and a driving force in the tracking direction is produced at two locations and therefore, as compared with the driver shown in FIG. 5, the driving force during the driving in the tracking direction increases.

Figure 14B:
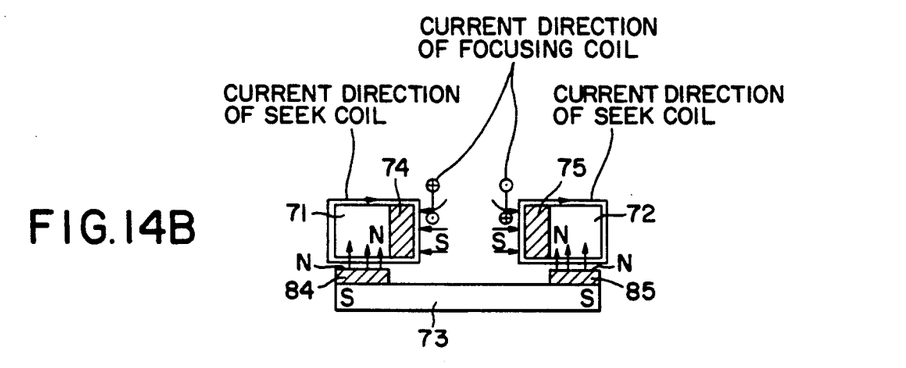
FIGS. 14B, 14C and 14D are cross-sectional views of magnetic circuits in seventh, eighth and ninth embodiments, respectively, of the present invention.
Figure 14C:
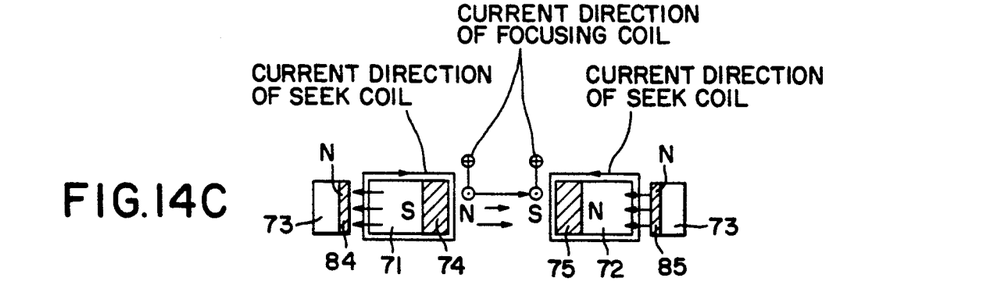
Figure 14D:
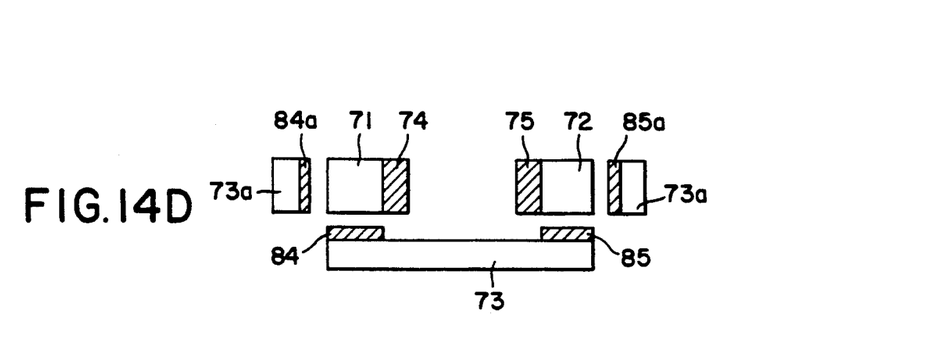

Seventh, eighth and ninth embodiments of the present invention are shown in FIGS. 14B, 14C and 14D, respectively. These embodiments are modifications of the sixth embodiment.

The seventh embodiment shown in FIG. 14B is of a form in which the magnetic poles of the opposed surfaces of permanent magnets 74 and 75 are the same and focusing coils 83 use the surface magnetic fluxes of the permanent magnets.

The eighth embodiment shown in FIG. 14C is of a form in which permanent magnets 84 and 85 for forming a second magnetic gap are disposed in opposed relationship with each other with a predetermined clearance therebetween on the back of those surfaces of back yokes 71 and 72 on which permanent magnets 74 and 75 are mounted, whereby magnetization vectors are arranged in a lateral line.

The ninth embodiment shown in FIG. 14D is of a form in which the constructions of the seventh and eighth embodiments are combined.

The polarities of the magnets are best in the form of FIG. 14A in which the magnetization vector circulates, but the construction will be possible even if the polarities of the magnets 84 and 85 opposed to the back yokes are made opposite.

Although in the above-described embodiments, the driving circuit for tracking and seeking are common to each other, tracking may be effected by the provision of a galvano mirror detached from the movable member and fixed to the apparatus.

Figure 15:
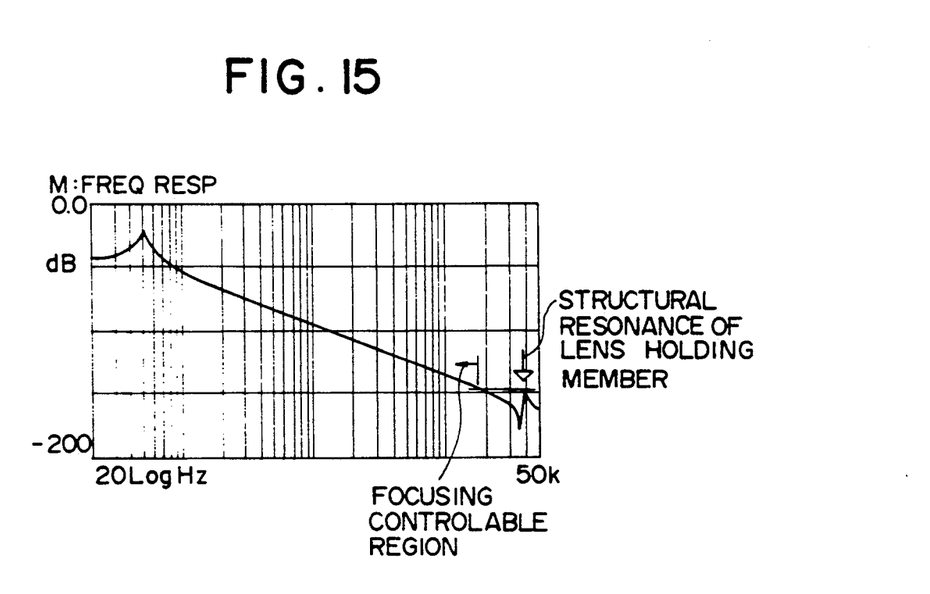
FIG. 15 shows the control characteristic of the objective lens holding member of the objective lens driver of the present invention.

FIG. 15 shows the dynamic characteristic of the focus control of the objective lens driver of the present invention. It can be seen that as compared with FIG. 4, the objective lens driver of the present invention is high in the structural resonance frequency of the lens holder. That is, it is seen that the focus controllable zone is wider.

What is claimed is:

1. An objective lens driver comprising:
   first and second permanent magnets disposed in opposed relationship with each other such that surfaces thereof, which oppose each other, have different magnetic poles;
   first and second yokes for supporting said first and second permanent magnets, respectively;
   an objective lens supporting member movably provided on said movable member and disposed in the magnetic gap;
   seeking coil means provided on said movable member and wound about said first and second permanent magnets and said first and second yokes for moving said objective lens supporting member in a tracking direction; and
   a focusing coil provided on said supporting member and disposed in the magnetic gap for moving said objective lens supporting member in a focusing direction.

2. An objective lens driver according to claim 1, wherein said objective lens supporting member is supported on said movable member by a leaf spring.

3. An objective lens driver according to claim 1, wherein said seeking coil means comprises a first coil wound on said first permanent magnet and said first yoke and a second coil wound on said second permanent magnet and said second yoke.

4. An objective lens driver comprising:
   first and second permanent magnets disposed in opposed relationship with each other;
   first and second yokes for supporting said first and second permanent magnets, respectively;
   a movable member, a portion of which is disposed in a first magnetic gap formed by said first and second permanent magnets;
   an objective lens supporting member movably provided on said movable member and disposed in the magnetic gap;
   seeking coil means provided on said movable member and wound about said first and second permanent magnets and said first and second yokes for moving said objective lens supporting member in a tracking direction;
   a focusing coil provided on said supporting member and disposed in the first magnetic gap for moving said objective lens supporting member in a focusing direction; and
   a third permanent magnet disposed in opposed relationship with said first and second yokes, for forming a second magnetic gap in which one side of said seeking coil means is positioned.

5. An objective lens driver according to claim 4, wherein said objective lens supporting member is supported on said movable member by a leaf spring.

6. An objective lens driver according to claim 4, wherein said first and second permanent magnets disposed in opposed relationship with each other differ in the magnetic poles of the opposed surfaces thereof.

7. An objective lens driver according to claim 4, wherein said seeking coil means comprises a first coil wound on said first permanent magnet and said first yoke and a second coil wound on said second permanent magnet and said second yoke.

8. An objective lens driver according to claim 4, wherein said third permanent magnet comprises one permanent magnet opposed to said first yoke, and another permanent magnet opposed to said second yoke.

9. An objective lens driver according to claim 8, wherein the permanent magnets of said third permanent magnet are opposed to the lower surfaces of said first and second yokes, respectively.

10. An objective lens driver according to claim 4, further comprising a pair of guide shafts for moving said movable member along said first and second yokes.

11. An objective lens driver comprising:
    first and second permanent magnets disposed in opposed relationship with each other such that surfaces thereof, which oppose each other, have different magnetic poles;
    first and second yokes for supporting said first and second permanent magnets, respectively;
    a movable member, a portion of which is disposed in a magnetic gap formed by said first and second permanent magnets;
    an objective lens supporting member movably provided on said movable member and disposed in the magnetic gap;
    seeking coil means provided on said movable member for moving said objective lens supporting member in a tracking direction; and
    a focusing coil provided on said supporting member and disposed in the magnetic gap for moving said objective lens supporting member in a focusing direction.

12. An objective lens driver comprising:
    first and second permanent magnets disposed in opposed relationship with each other;
    first and second yokes for supporting said first and second permanent magnets, respectively;
    a movable member, a portion of which is disposed in a first magnetic gap formed by said first and second permanent magnets;
    an objective lens supporting member movably provided on said movable member and disposed in the first magnetic gap;
    seeking coil means provided on said movable member for moving said objective lens supporting member in a tracking direction;
    a focusing coil provided on said supporting member and disposed in the first magnetic gap for moving said objective lens supporting member in a focusing direction; and
    a third permanent magnet disposed in opposed relationship with said first and second yokes, for forming a second magnetic gap in which one side of said seeking coil means is positioned.

13. An optical information recording and/or reproducing apparatus comprising:
    first and second permanent magnets disposed in opposed relationship with each other such that surfaces thereof, which oppose each other, have different magnetic poles;
    first and second yokes for supporting said first and second permanent magnets, respectively;
    a movable member, a portion of which is disposed in a first magnetic gap formed by said first and second permanent magnets;

an objective lens supporting member movably provided on said movable member and disposed in the magnetic gap;

seeking coil means provided on said movable member for moving said objective lens supporting member in a tracking direction; and a focusing coil provided on said supporting member and disposed in the magnetic gap for moving said objective lens supporting member in a focusing direction.

14. An optical information recording and/or reproducing apparatus comprising:

first and second permanent magnets disposed in opposed relationship with each other;

first and second yokes for supporting said first and second permanent magnets, respectively;

a movable member, a portion of which is disposed in a first magnetic gap formed by said first and second permanent magnets;

an objective lens supporting member movably provided on said movable member and disposed in the first magnetic gap;

seeking coil means provided on said movable member for moving said objective lens supporting member in a tracking direction;

a focusing coil provided on said supporting member and disposed in the first magnetic gap for moving said objective lens supporting member in a focusing direction; and a third permanent magnet disposed in opposed relationship with said first and second yokes, for forming a second magnetic gap in which one side of said seeking coil means is positioned.

* * * * *

UNITED STATES PATENT AND TRADEMARK OFFICE
CERTIFICATE OF CORRECTION

PATENT NO. : 5,305,151
DATED : April 19, 1994
INVENTOR(S) : Hiroaki KAKIMOTO, et al.

Figure 4:
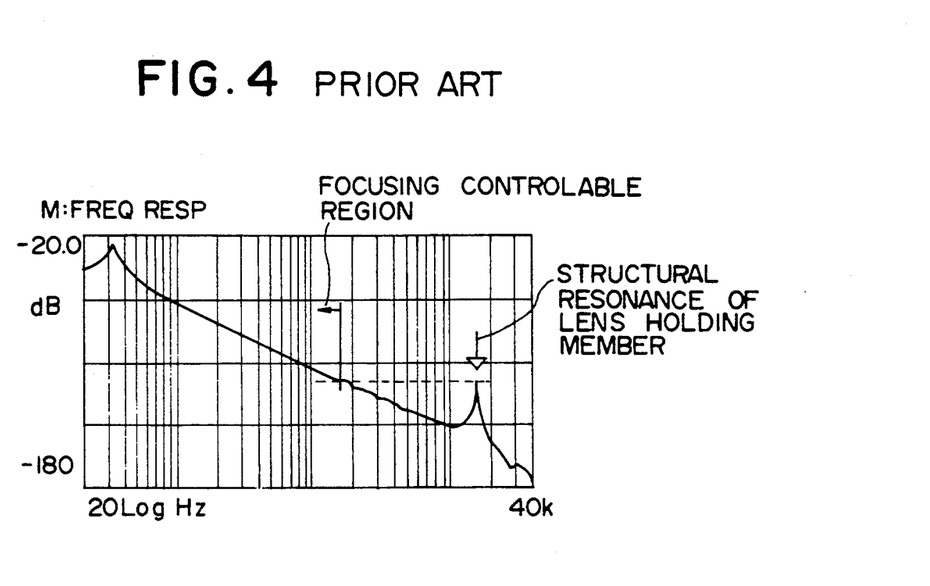
FIG. 4 shows the control characteristic of the objective lens holding member of the objective lens driver shown in FIG. 1.

It is certified that error appears in the above-indentified patent and that said Letters Patent is hereby corrected as shown below:

IN THE DRAWINGS:

In Fig. 4, "CONTROLABLE" should read --CONTROLLABLE--.
In Fig. 15, "CONTROLABLE" should read --CONTROLLABLE--.

IN THE DISCLOSURE:

COLUMN 4:

Line 7, "parallel piped" should read --parallelepiped--.

COLUMN 7:

Line 15, "respectively;" should read --respectively;¶
a movable member, a portion of which is disposed in a magnetic gap formed by said first and second permanent magnets;--.

Signed and Sealed this

Eighteenth Day of October, 1994

Attest:

BRUCE LEHMAN

*Attesting Officer*   *Commissioner of Patents and Trademarks*